H. KRETZ.
REMOVABLE CLOSURE FOR VEHICLES.
APPLICATION FILED FEB. 11, 1908.
981,771.
Patented Jan. 17, 1911.
2 SHEETS—SHEET 1.
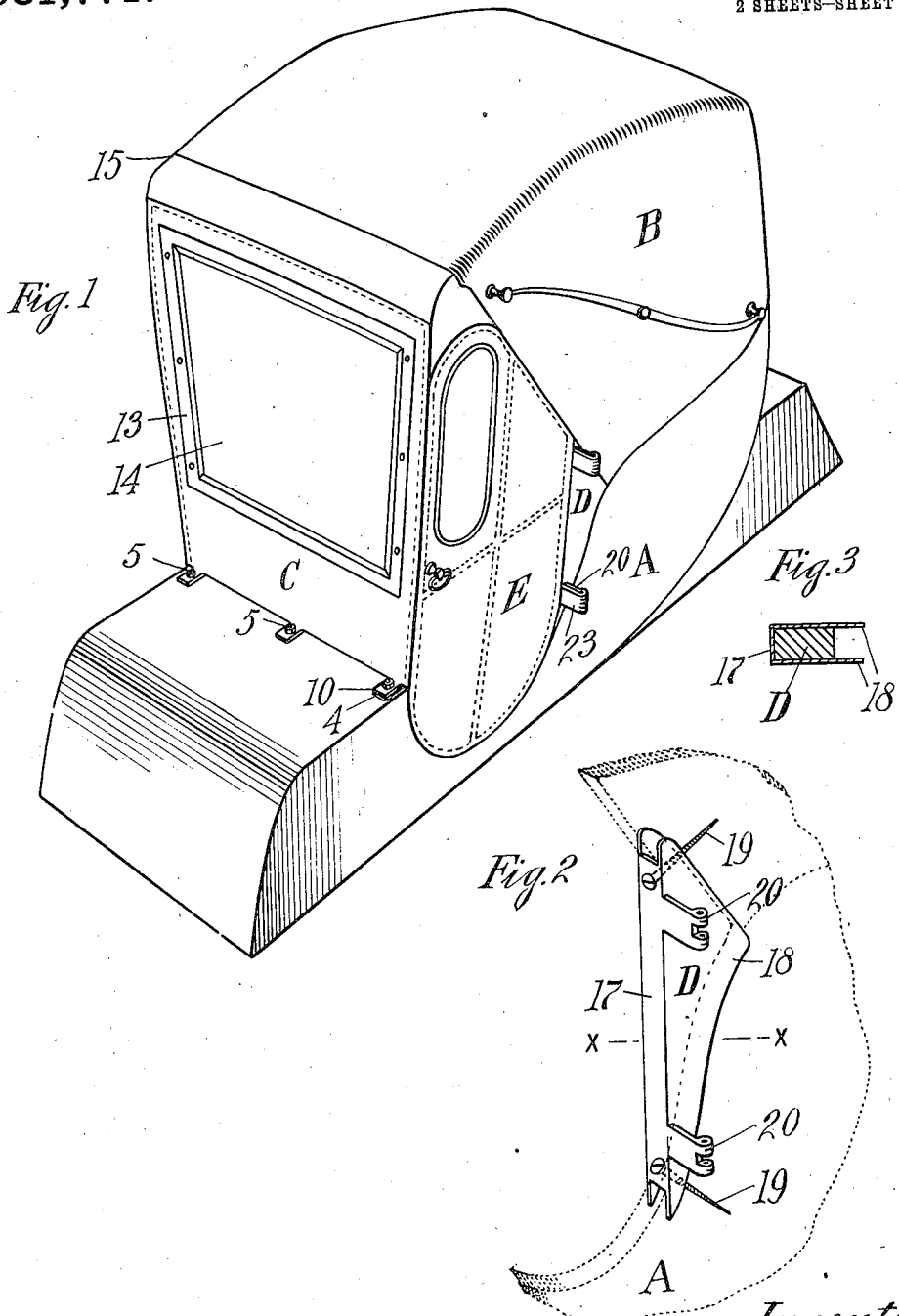
Witnesses,
George Voelker
Hattie Smith
Inventor,
Hermann Kretz
by Lothrop & Johnson
his Attorneys.

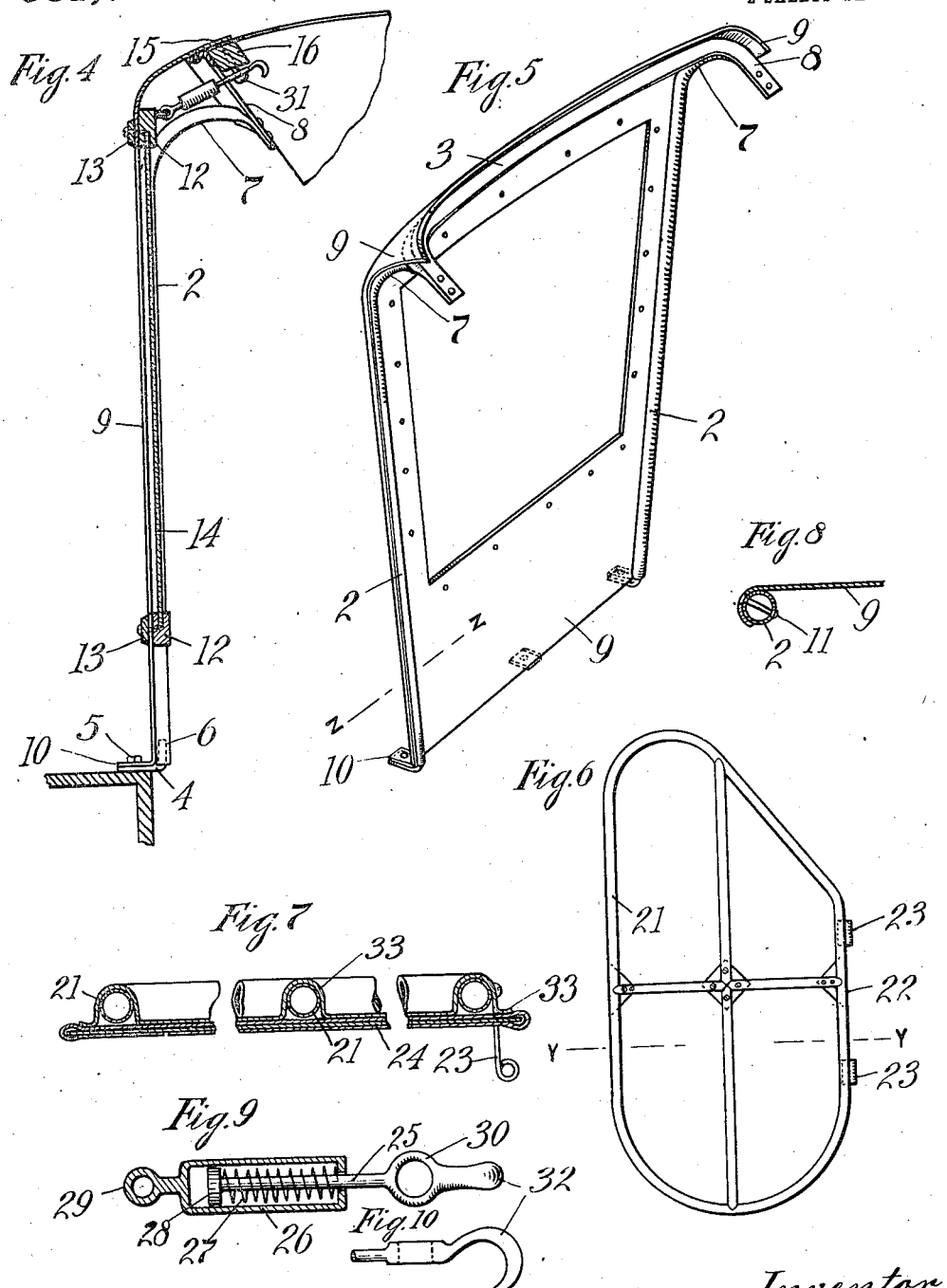

UNITED STATES PATENT OFFICE.

HERMANN KRETZ, OF ST. PAUL, MINNESOTA.

REMOVABLE CLOSURE FOR VEHICLES.

981,771.

Specification of Letters Patent. Patented Jan. 17, 1911.

Application filed February 11, 1908. Serial No. 415,405.

*To all whom it may concern:*

Be it known that I, HERMANN KRETZ, a citizen of the United States, residing at St. Paul, in the county of Ramsey and State of Minnesota, have invented certain new and useful Improvements in Removable Closures for Vehicles, of which the following is a specification.

My invention relates to improvements in removable closures for vehicles, particularly automobiles, and is designed to be used in connection with the ordinary open hood or summer top, its object being to provide an improved light closure which may be easily and quickly secured to, and removed from, the vehicle, and which, when adjusted in place, will form a complete closure for the front and side portions thereof.

More particularly the invention consists in the construction, combination and arrangement of parts hereinafter described and claimed.

In the accompanying drawings forming part of this specification, Figure 1 is a perspective view of the body of a hooded automobile fitted with my improved closure; Fig. 2 is a perspective view of one of the hinge blocks for the side doors, showing a fragment of the adjacent body portion in dotted lines; Fig. 3 is a horizontal section through the hinge block on line $x$—$x$ of Fig. 2; Fig. 4 is a vertical section through the front portion of the closure and fragments of the hood and body portion to which it is secured; Fig. 5 is a perspective view of the front portion of the closure without the window frame or glass; Fig. 6 is an elevation of the framework of one of the doors; Fig. 7 is an enlarged section through a door on line $y$—$y$ of Fig. 6, with some parts broken away; Fig. 8 is a horizontal section through a fragment of the front frame and shield on line $z$—$z$ of Fig. 5; Fig. 9 is a longitudinal section through the cylinder or casing for the spring fastening at the top of the closure, and Fig. 10 is a side elevation of the handle at the outer end of the spring fastening.

In the drawings I have shown the application of my invention to an automobile, but it is to be understood that the invention is equally applicable to other hooded vehicles.

In the drawings A represents the body of an automobile or other vehicle and B the hood or summer top. The closure comprises a front portion C, a pair of hinge blocks D and a pair of side doors E.

The front portion comprises a frame consisting, preferably, of two upwardly extending tubes or pipes 2 supported at the bottom upon the body of the automobile or vehicle, and connected at the top by means of an angle bar 3. The pipes may be secured at the bottom to the automobile or vehicle body in any suitable way. In the drawings I have shown them each supported upon an angle bracket 4 bolted to the automobile body by means of a bolt 5, and having an upturned end 6 over which the pipe is fitted. At their upper portions the tubes are arched or bent over at 7 to meet the summer top B and to follow the shape of the upper portion of the doors, and the ends 8 of the angle bar are bent laterally to meet and overlap the tubes, to which they are bolted or otherwise secured.

Secured to the framework formed by the tubes and angle bar is a sheet metal shield 9. This is shown secured at the bottom to the vehicle body by means of the bolts 5 which pass through the out turned flanges or lips 10 of the shield. The shield is secured to the side tubes 2 by being bent around the same, as shown in Fig. 8, and bolted thereto by means of bolts 11, or in any other suitable way. The middle portion of the shield is cut out for a window. As shown in Fig. 4 a frame 12 is secured upon the inside of the shield about the window opening and to this is secured on the outside of the shield a molding 13. In the frame is secured a glass panel 14. As shown in Fig. 4, the metal shield 9 is bent over at the top to meet and overlap the front cross bar 16 of the hood frame, and a little inwardly from its outer end it is bolted to the angle bar 3. Thus the angle bar will abut against the face of the cross bar 16 of the hood while the outer end 15 of the shield will overlap the top of the cross bar, and form with it a water tight joint.

The hinge block D is formed with a vertical outer edge 17, while its inner edge is shaped to conform to the side edge of the body and hood of the vehicle. It is preferably sheathed with sheet metal having inwardly projecting side flanges 18 which overlap, and embrace between them, the side edges of the vehicle frame and hood, thus forming a water tight lap joint and making the connection firm and secure. The block is fastened to the side edge of the body portion and hood by means of screws 19 or other removable fastenings. Integral with, or secured to, the vertical front edge 17 of the block are hinge members 20.

Each of the side doors comprises a rigid frame 21, preferably of piping, shaped to fit the body and hood of the vehicle and the front portion of the closure, the different members of the frame being brazed, bolted, or otherwise suitably secured together. The rear side 22 of the frame is vertical and provided with hinge members 23 whereby the door is hinged to the hinge members 20 upon the block D, and the forward side of the frame fits closely against the frame of the front portion. The frame is provided with suitable upholstering 24 upon the inner side, and is covered with carriage cloth or other suitable material 33 upon the outer side. The blocks D may also be covered or upholstered as may be desired.

The closure-front C is secured to the carriage top by means of a spring fastener 25. As shown in the drawings the fastener has sliding support in a casing or cylinder 26, in which it is held normally retracted by means of a spring 27 arranged between the forward end of the cylinder and the lug or piston 28 at the inner end of the shank. The cylinder is shown pivotally secured to the frame 12 by means of a ring 29. Near its outer end the fastener is formed with a loop 30 adapted to be slipped over the headed bolt 31 on the underside of the frame member 16 of the vehicle top, and at its extreme end it has a finger piece or hook 32. The spring fastener makes an elastic or yielding connection between the top of the closure and the hood to take up the strain and allow some play between the parts in case of jolts and jars.

To adjust the closure to an automobile or other vehicle the front portion C is bolted at the bottom to the forward part of the vehicle body by means of the bolts 5, and the upper portion thereof is pressed or drawn against the top of the hood. The upper end 15 of the shield will overlap the top of the hood while the downwardly extending portion of the angle bar 3 will abut against the face of the cross bar 16, and form a stop against further rearward movement of the closure-front C. The front portion is then secured in that position by means of the spring catch. The hinge blocks D are fitted and secured in place as illustrated in Fig. 2 and the doors E are hinged thereto. The closure is then complete and ready for use. To remove the closure the doors are unhinged, the hinge block unscrewed, the bolts 5 removed, the spring catch disengaged from the bolt 31, and the front portion removed.

It will be observed that the closure here described is of such light construction and of such extreme simplicity in operation that it can be adjusted and removed with great ease and quickness. And as the various constituent parts of the closure are shaped to conform to the shape of the vehicle body and hood, and are for the most part rabbeted to them by lap joints, the closure is complete and water tight. By reason of the stiff frame construction of the closure it is possible to have doors which may be opened and closed like the doors of a closed carriage.

It is obvious that various modifications may be made in the details of construction without departing from the principle of the invention, the scope of which is defined in the claims.

I claim as my invention:

1. In a removable closure of the class described, the combination, with a vehicle body and its hood, of a front member comprising a frame consisting of tubular end uprights having arched portions at the upper ends thereof, angle brackets arranged at the lower ends of the uprights for detachably securing said uprights to the vehicle body, said angle brackets fitting within the lower ends of said tubular uprights, and being attachable to the vehicle body, a cross bar forming the top member of the frame rigidly secured to the upper ends of the uprights and forming an abutment for the hood, a sheet metal front shield secured to the frame and having its upper end bent rearwardly over the cross bar and projected beyond the same so as to overlap the hood, and a detachable spring fastener elastically securing the top of the closure to the hood.

2. In a removable closure of the class described, the combination, with a vehicle body and its hood, of a front member comprising a frame and a sheet metal shield secured thereto, the frame consisting of tubular end uprights detachably secured to the vehicle body and arched at their upper ends to meet the sides of the hood, angle brackets fitting within the lower ends of said tubular uprights, and being attachable to the vehicle body, a cross bar directly secured to the rearwardly arched upper ends of the uprights and forming an abutment for the front of the hood, and a sheet metal shield secured to the frame and bent over and beyond the cross bar so as to overlap the top of the hood, said shield having fastening means arranged at the bottom thereof for detachably securing the shield to the vehicle body.

3. In a removable closure of the class described, the combination, with a vehicle body and its hood, of a front member comprising a frame and a metal shield secured thereto, the frame consisting of two end uprights of hollow metal piping secured at the bottom by angle brackets attached to the vehicle body and arched rearwardly at the top to meet the sides of the hood, an angle bar forming the top member of the frame and having its ends bent laterally and secured to the arched upper ends of the uprights, said angle bar forming an abutment for the front of the hood, and means for detachably connecting the front member to the vehicle body.

4. In a removable closure of the class described, the combination with a vehicle body and its hood, of a pair of hinge blocks arranged at the sides of the body and each provided with a metallic sheathing the edges of which project beyond the edges of the block to form flanges which overlap and embrace the side edges of the body and hood, means for detachably fastening the hinge blocks to the body and hood, a side door hinged upon each of said blocks and lying flush with the body and hood, a front member, the doors and front member forming close joints with each other, means for detachably connecting the lower portion of the front member with said body, and means for detachably connecting the upper portion of the front member with said hood.

In testimony whereof I affix my signature in presence of two witnesses.

HERMANN KRETZ.

Witnesses:
ARTHUR P. LOTHROP,
HATTIE SMITH.